United States Patent
Regan

(10) Patent No.: US 9,261,149 B2
(45) Date of Patent: Feb. 16, 2016

(54) NO-BACK CHECK DEVICE

(75) Inventor: James M. Regan, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 920 days.

(21) Appl. No.: 13/413,858

(22) Filed: Mar. 7, 2012

(65) Prior Publication Data

US 2013/0237362 A1 Sep. 12, 2013

(51) Int. Cl.
- *F16D 41/00* (2006.01)
- *F16D 65/00* (2006.01)
- *B64C 13/34* (2006.01)
- *F16D 66/00* (2006.01)

(52) U.S. Cl.
CPC ............. *F16D 41/00* (2013.01); *B64C 13/34* (2013.01); *F16D 65/0043* (2013.01); *F16D 2066/006* (2013.01)

(58) Field of Classification Search
CPC ...................................................... B64C 13/34
See application file for complete search history.

(56) References Cited

U.S. PATENT DOCUMENTS

| | | | |
|---|---|---|---|
| 7,293,524 B2 * | 11/2007 | Darby | 116/281 |
| 2009/0090203 A1 * | 4/2009 | Jones et al. | 74/89.39 |
| 2011/0021307 A1 * | 1/2011 | Davies | 475/254 |
| 2011/0094848 A1 | 4/2011 | Bernhard et al. | |

FOREIGN PATENT DOCUMENTS

EP 1669624 A1 6/2006

OTHER PUBLICATIONS

Extended Eurporean Search Report for application EP 13157975, Jun. 25, 2013, 5 pages.

* cited by examiner

*Primary Examiner* — Erin D Bishop
(74) *Attorney, Agent, or Firm* — Cantor Colburn LLP

(57) ABSTRACT

A device and method for determining whether a no-back device is functioning properly includes a no-back device coupling an input shaft and an output shaft. A no-back output gear is coupled to the output shaft, and a reaction gear is operably coupled to the no-back output gear. A check device includes a rotatable drive feature having a first end accessible for rotation and a second end engaged with the reaction gear. The functionality of the no-back device is evaluated by applying a rotational torque to the drive feature.

15 Claims, 3 Drawing Sheets

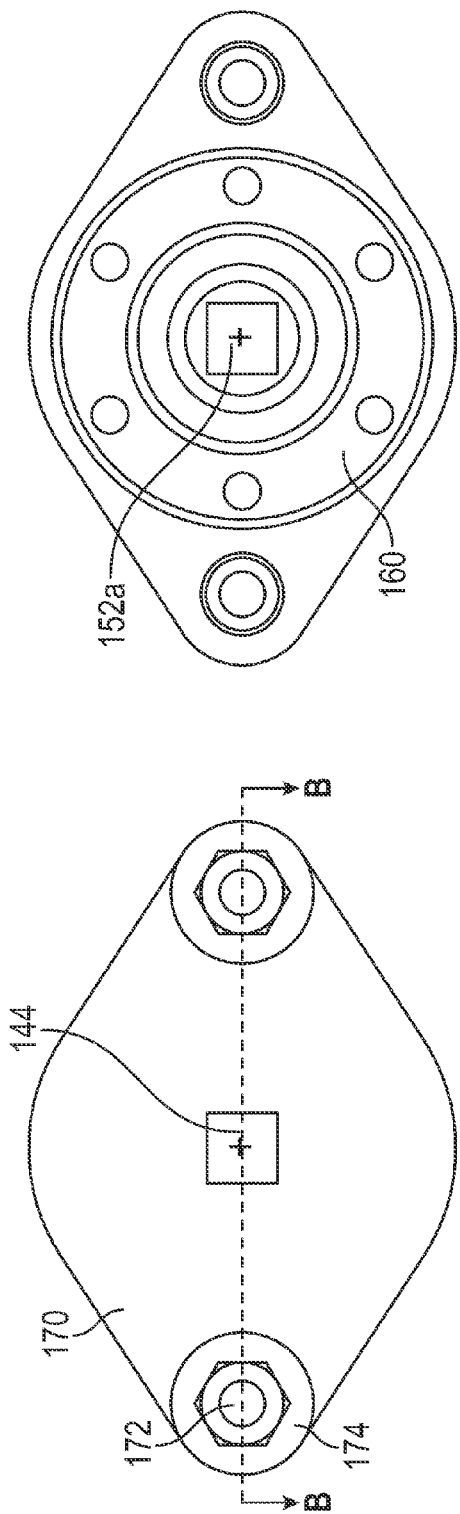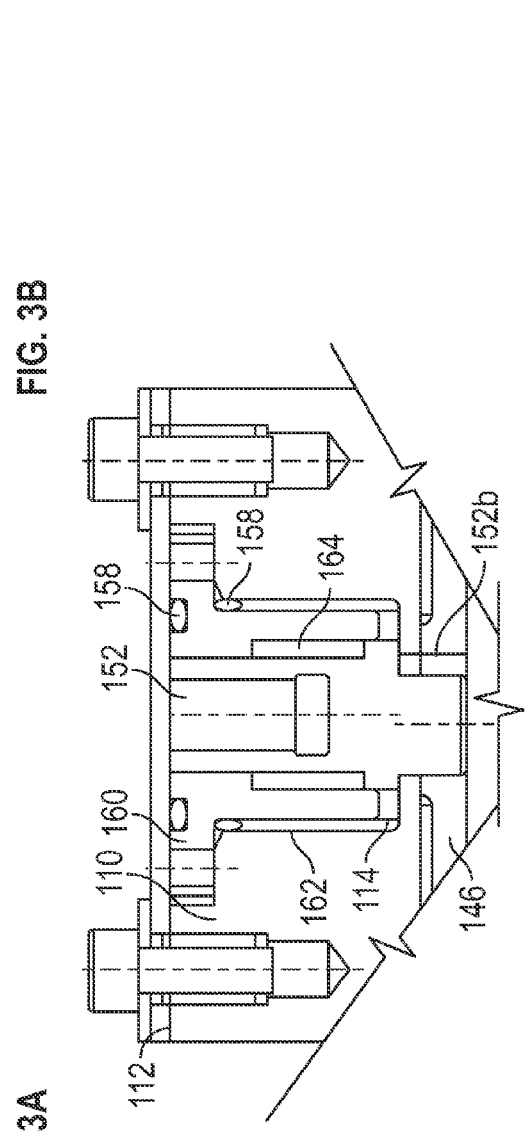

NO-BACK CHECK DEVICE

BACKGROUND OF THE INVENTION

This invention relates to an actuation system and more particularly to an actuation system having a no-back device.

Modern aircrafts are commonly equipped with actuators containing no-back devices. These actuators are subjected to aerodynamic loads resulting from the distribution of loads in the aircraft, from the trajectory of the aircraft, and from the flight conditions. No-back devices are employed in actuators of mechanical drive systems where it is necessary to prevent an aerodynamic load, from back driving the system in the event of a structural failure or disconnect of the input shaft to an actuator. A typical no-back device has a releasable brake associated with an output shaft as well as an input shaft connected to a prime mover. A coupling between the input shaft and output shafts operates in response to the transmission of torque from the output shaft to the input shaft to prevent movement of the output shaft, and assure that the element associated with the output shaft will remain in the position in which it was originally placed by operation of the prime mover.

The functionality of the no-back device is critical in instances where it is required. A failure of a no-back device is potentially dangerous since a shaft could be driven by the aerodynamic forces acting on the element to be actuated. The element would then not be held in the desired position, and could flutter rendering the aircraft unstable. It is therefore desirable to develop a system that easily and efficiently allows a mechanic to verify that the no-back device in an actuator is functioning properly.

BRIEF DESCRIPTION OF THE INVENTION

According to one embodiment of the invention, a device for determining the functionality of a no-back device includes a no-back device coupling an input shaft and an output shaft. A no-back output gear is coupled to the output shaft. A reaction gear is operably coupled to the no-back output gear. A check device includes a rotatable drive feature having a first end accessible for rotation and a second end engaged with the reaction gear. The functionality of the no-back device may be evaluated by applying a rotational torque to the drive feature.

According to another embodiment of the invention, a device for determining the functionality of a no-back device in an actuator includes an actuator housing. Within the actuator housing is a no-back device coupling an input shaft and an output shaft. A no-back output gear is coupled to the output shaft adjacent an external surface of the no-back device. A reaction gear is operably coupled to the no-back output gear. The device further includes a check device having a rotatable drive feature with a first end extending through and accessible from the actuator housing and a second end engaged with the reaction gear. The functionality of the no-back device may be determined by applying a rotational torque to the drive feature.

According to yet another embodiment of the invention, a method for verifying the functionality of a no-back device is provided including locking an output shaft against rotation and allowing an input shaft to freely rotate. The stop device is then removed from the check device such that the drive feature may freely rotate. The drive feature is rotated to a first position and the rotation of an input shaft is evaluated. The drive feature is then rotated to a second position where the rotation of an input shaft is again evaluated.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3A is an top view of an alternate embodiment of the invention;

FIG. 3B is a top view of FIG. 3A with the cover removed; and

FIG. 3C is a cross-sectional side view of FIG. 3A taken across line B-B.

The detailed description explains embodiments of the invention, together with advantages and features, by way of example with reference to the drawings.

DETAILED DESCRIPTION OF THE INVENTION

Figure 1:
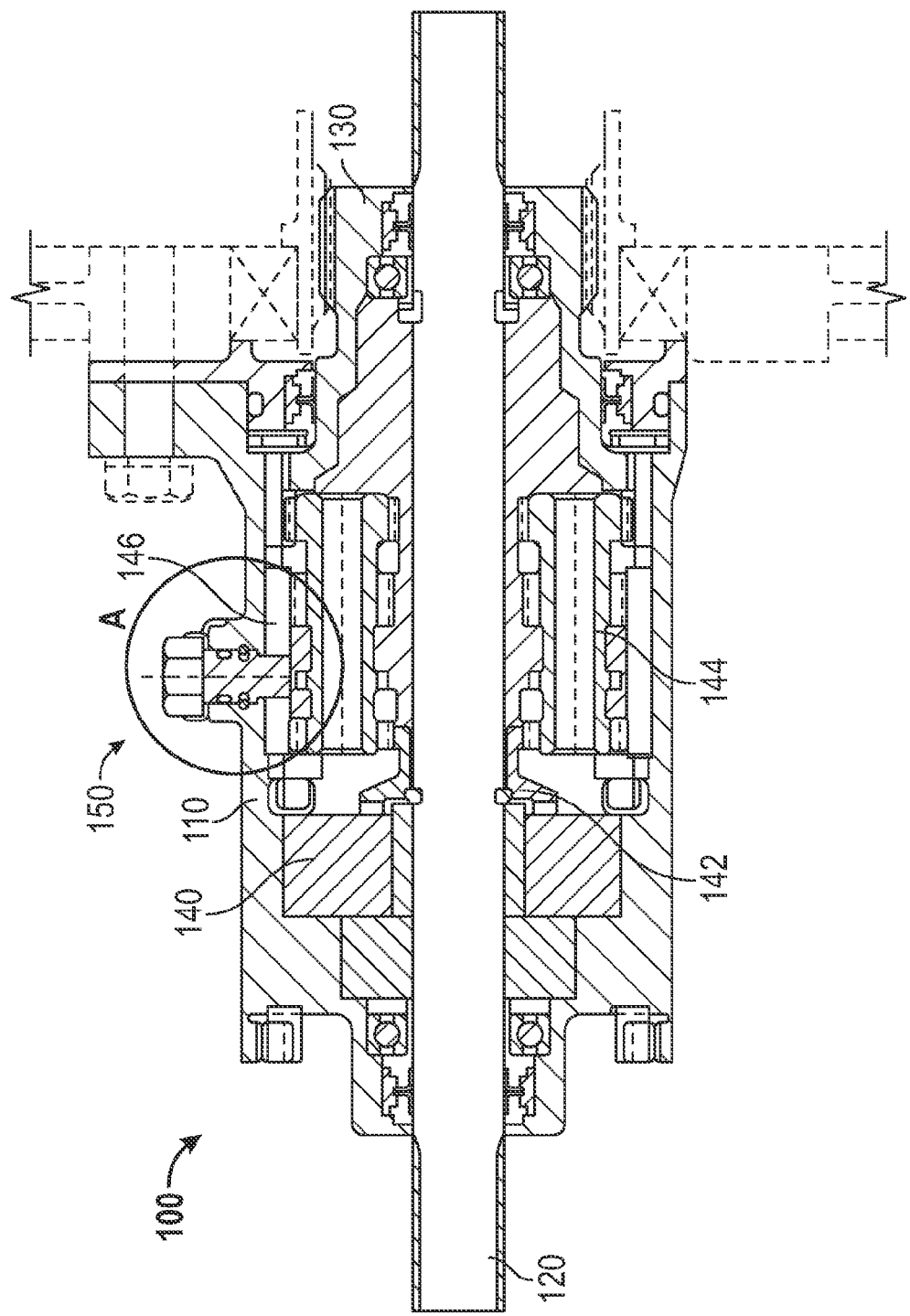
FIG. 1 is a cross-sectional view of an actuator assembly.

Referring first to FIG. 1, an actuator assembly 100 usable in an aircraft is shown. The actuator assembly 100 includes an actuator housing 110. An input shaft 120 is coupled to an output shaft 130 in a coaxial relation. Providing a connection between the input shaft 120 and output shaft 130 is a no-back device 140. The output shaft 130 is locked by the no-back device 140 to prevent external loads from back driving the actuator assembly 100 into a potentially hazardous position in the event of a structural failure or disconnect of the input shaft to the actuator. The input shaft 120 may be driven either clockwise or counterclockwise. When the no-back device 140 is functioning properly and the input shaft 120 is stationary, the output shaft 130 is automatically locked against back driving, in either the clockwise or counterclockwise directions. No-back devices are known and a person having ordinary skill in the art would be able to select a no-back device appropriate for the particular application.

Positioned adjacent an external surface of the no-back device 140 is a no-back output gear 142, such as a sun gear for example. A reaction gear 146 is coupled with the no-back output gear 142. In one embodiment, the reaction gear 146 is directly coupled to the no-back output gear 142. In an alternate embodiment, the reaction gear 146 is indirectly coupled to the no-back output gear 142 through a planetary gear assembly 144 having at least one additional gear. A check device 150 engages the reaction gear 146, such that rotation of the check device 150 while the output shaft 130 is locked determines whether the no-back device 140 is functioning properly.

Figure 2A:
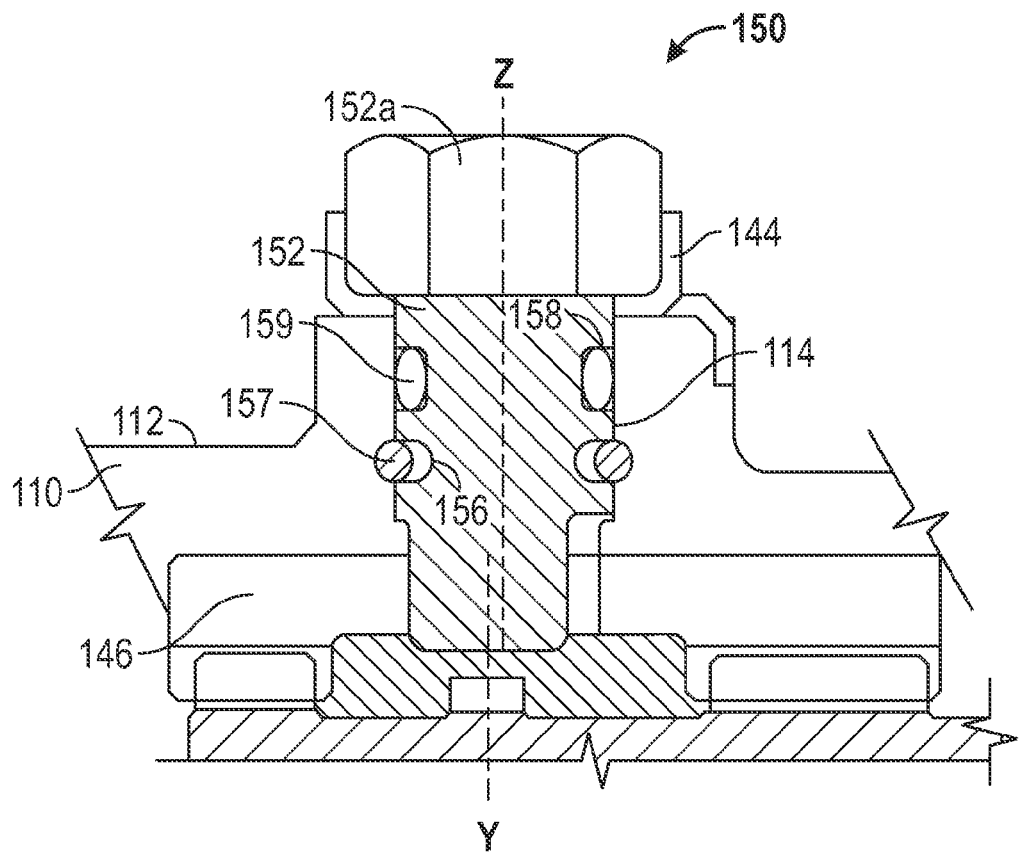
FIG. 2A is a detailed view of an embodiment of the invention as shown in circled area A in FIG. 1.
Figure 2B:
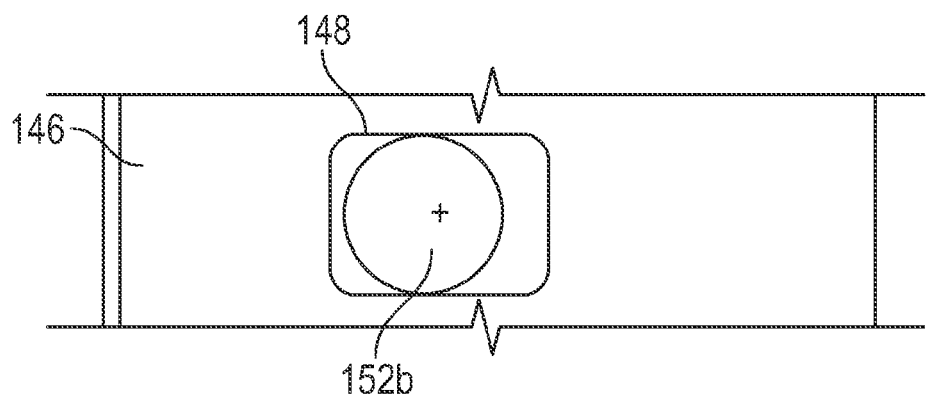
FIG. 2B is a bottom view of the FIG. 2A.

In a first embodiment of the invention, shown in FIGS. 2A and 2B, the check device 150 includes a drive feature 152, extending through a hole 114 in the actuator housing 110, allowing rotation between a first position and a second position. A first end 152a of the drive feature 152 is accessible from outside the actuator by a person, such as a mechanic for example. The first end 152a is positioned adjacent the outer surface 112 of the actuator housing 110. In one embodiment, this first end 152a of the drive feature 152 includes a head, such as a hex head, that allows a mechanic to easily apply a rotational torque to the drive feature 152. A stop device 144, such as a lock washer for example, is disposed between the first end 152a of the drive feature 152 and the actuator housing 110 to prevent unwanted rotation of the drive feature 152 when a mechanic is not checking the functionality of the no-back device. The body of the drive feature 152 between the first end 152a and the second end 152b includes a first groove 156. An axial retention feature 157, such as a C-clip for example, connects to drive feature 152 and is positioned within the first groove 156 to prevent the drive feature 152 from sliding vertically relative to the actuator housing 110. Disposed along the body of the drive feature 152 between the first groove 156 and the first end 152a is a circumferential second groove 158. A seal 159 fits between the second groove 158 and the actuator housing 110 to prevent moisture from entering the actuator assembly 100.

The second end 152b of the drive feature 152 includes an eccentric feature that extends into a slot 148 in the reaction gear 146. In one embodiment, the drive feature 152 is an eccentric pin, wherein the central axis Z of the first end 152a of the pin is offset from the central axis Y of the second end 152b of the pin. When a rotational force or torque is applied to the first end 152a of the drive feature 152, the eccentric feature of the second end 152b moves with respect to the slot 148. This movement of the second end 152b creates a rotation of the reaction gear 146 which in turn causes a magnified rotation of the no-back output gear 142.

In an alternate embodiment of the check device 150, shown in FIGS. 3A-3C, a threaded insert 160 is threadably engaged with hole 114 of the actuator housing 110. The threaded insert 160 includes a flange attached to a body having a plurality of threads on an external surface 162 of the threaded insert 160. The threaded insert 160 extends substantially from the reaction gear 146 to the actuator housing 110 such that when the threaded insert 160 is seated in position, the top surface of the flange is substantially flush with the outer surface 112 of the actuator housing 110. Disposed within the threaded insert 160 is a drive feature 152 having a first end 152a accessible from the actuator housing 110 and a second end 152b extending into a slot 148 of reaction gear 146. Coupled to the drive feature between the first end 152a and the second end 152b is a bearing 164 to minimize the drag of the drive feature 152 as it rotates within the threaded insert 160. A seal 158 is located between the threaded insert 160 and the actuator housing 110. An additional seal exists between the threaded insert 160 and a cover plate 170 of the check device 150 to prevent moisture from entering the actuator assembly 100.

A cover plate 170 having at least one fastener 172 attaches to the outer surface 112 of the actuator housing 110. Positioned between each fastener 172 and the housing 110 may be a washer 174. Removal of the cover plate 170 from engagement with the actuator housing 110 exposes the first end 152a of the drive feature 152. A stop device 144 is incorporated into the cover plate 170. The surface of the cover plate 170 facing the drive feature 152 includes a protrusion 144 having a shape complementary to the first end 152a of the drive feature 152. In one embodiment, the first end 152a of the drive feature 152 is square. When the cover plate 170 is attached to the actuator housing 110, the first end 152a of the drive feature 152 aligns with the inner edge of the protrusion 144 such that the first end 152a is confined within the protrusion 144 and is thereby prevented from freely rotating.

To check the functionality of the no-back device 140, an aircraft mechanic first adjusts the actuator assembly 100 such that the output shaft 130 is locked and the input shaft 120 is free to rotate. The mechanic then removes the stop device 144 of the check device 150 so that the drive feature 152 can rotate. In the illustrated embodiments, removal of the stop device 144 includes removing either a lock washer or a cover plate from engagement with the drive feature 152. The first end 152a of the drive feature 152 is then rotated clockwise ninety degrees from a normal to a first "Check-Clockwise" position. After the mechanic performs a check of the no-back device 140 with the drive feature 152 in the first position, the first end 152a of the drive feature 152 is rotated back to the normal position. The mechanic then rotates the drive feature 152 ninety degrees in counterclockwise to a second "Check-Counterclockwise" position where the mechanic again evaluates the functionality of the no-back device 140. After the functionality of the no-back device 140 has been verified in both the clockwise and counterclockwise positions, the drive feature 152 is returned to the normal position, and the stop device 144 is re-engaged. The rotation of the drive feature 152 to each of the first and second positions results in a specific amount of rotation of the reaction gear 146. Dependent on the gear ratio between the reaction gear 146 and the no-back output gear 142, the generally small amount of rotation of the reaction gear 146 will result in a substantially magnified angular rotation of the no-back output gear 142.

This rotation of the no-back output gear 142 is used to verify the functionality of the no-back device 140. If the no-back device 140 has no lost motion, braking of the no-back output gear should result if the no-back device 140 is functioning correctly. If the no-back device 140 includes lost motion, the no-back output gear 142 must be sufficiently rotated beyond the lost motion threshold for braking of the no-back output gear 142 to result, thereby demonstrating the proper functioning of the no-back device 140. If, however, the no-back device 140 is not functioning properly, regardless of whether it includes lost motion, rotation of the no-back output gear 142 will result in visible rotation of input shaft 120, and service is required.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A device for determining the functionality of a no-back device comprising:
    the no-back device coupling an input shaft and an output shaft;
    a no-back output gear coupled to the output shaft;
    a reaction gear operably coupled to the no-back output gear; and
    a check device including a rotatable drive feature having a first end accessible for rotation and a second end engaged with the reaction gear such that the functionality of the no-back device is determined by applying a rotational torque to the drive feature.

2. The device according to claim 1, wherein the reaction gear is indirectly coupled to the no-back output gear.

3. The device according to claim 1, wherein the reaction gear is directly coupled to the no-back output gear.

4. The device according to claim 1, further comprising a stop device for preventing unwanted rotation of the drive feature.

5. The device according to claim 1, wherein the second end of the drive feature has an eccentric feature.

6. The device according to claim 5, wherein the drive feature is an eccentric pin.

7. The device according to claim 1, wherein an axial retention feature prevents the drive feature from moving vertically.

8. A device for determining the functionality of a no-back device in an actuator comprising:
   an actuator housing;
   the no-back device disposed within the actuator housing, the no-back device coupling an input shaft and an output shaft;
   a no-back output gear coupled to the output shaft, the no-back output gear being positioned adjacent an external surface of the no-back device;
   a reaction gear operably coupled to the no-back output gear; and
   a check device including a rotatable drive feature having a first end extending through and accessible from the actuator housing and a second end engaged with the reaction gear such that the functionality of the no-back device is determined by applying a rotational torque to the drive feature.

9. The device according to claim 8, wherein the reaction gear is indirectly coupled to the no-back output gear.

10. The device according to claim 8, further comprising a stop device for preventing unwanted rotation of the drive feature.

11. The device according to claim 10, wherein the stop device is a lock washer.

12. The device according to claim 10, wherein the stop device is a protrusion on a cover plate that aligns with the first end of the drive feature when attached to the actuator housing.

13. The device according to claim 8, wherein the second end of the drive feature includes an eccentric feature.

14. The device according to claim 13, wherein the drive feature is an eccentric pin.

15. The device according to claim 8, wherein the check device includes at least one seal for preventing moisture from entering the actuator.

\* \* \* \* \*